April 7, 1942.                    L. J. KELLEN                    2,279,140
                 ELECTRICAL TIRE PRESSURE GAUGE AND INDICATOR
                    Filed July 11, 1940            2 Sheets-Sheet 1
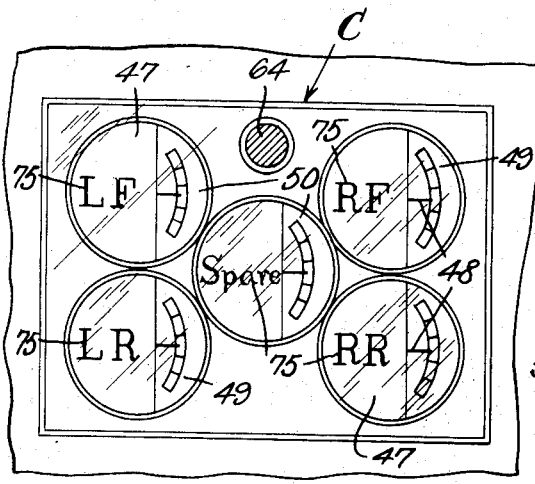
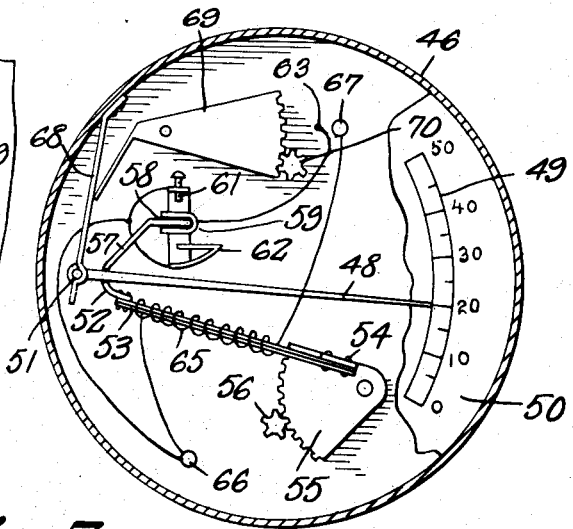
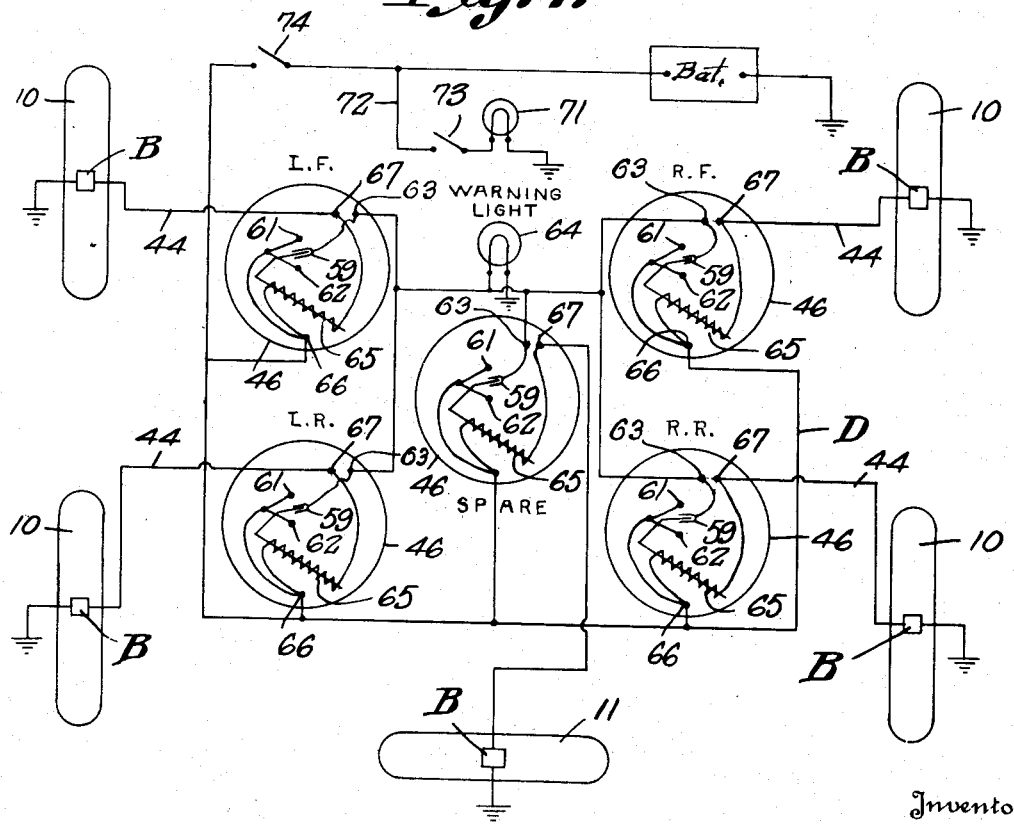
Inventor
Leo J. Kellen
By
Attorney April 7, 1942.                     L. J. KELLEN                     2,279,140
                    ELECTRICAL TIRE PRESSURE GAUGE AND INDICATOR
                             Filed July 11, 1940                 2 Sheets-Sheet 2
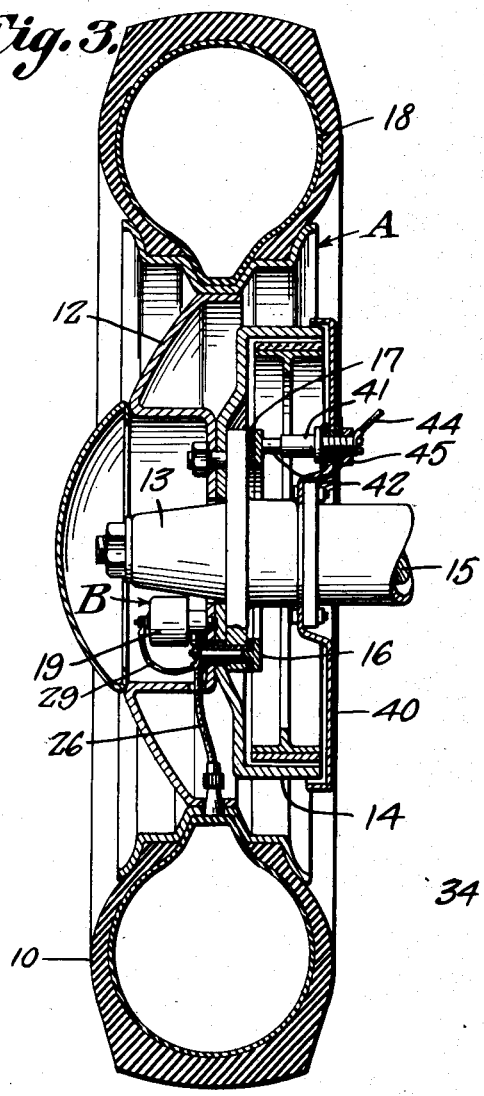
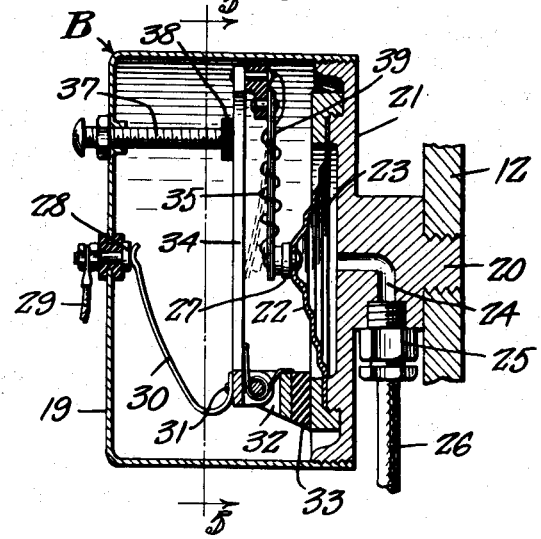
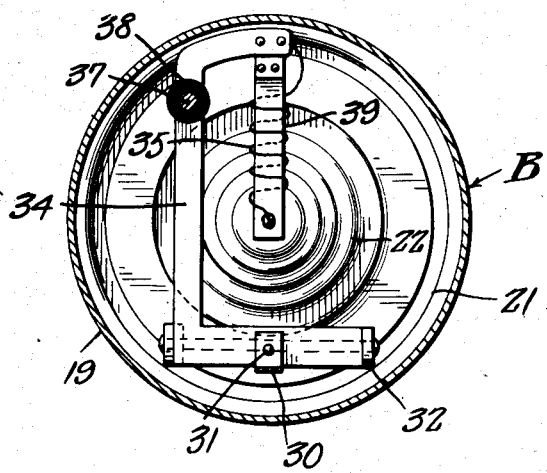
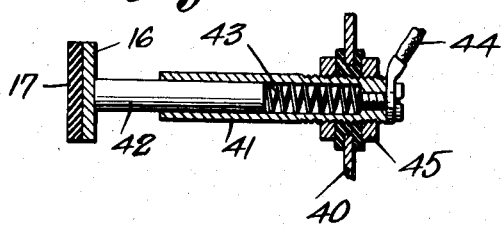
Leo J. Kellen,
*Inventor*
By
*Attorney*

Patented Apr. 7, 1942

2,279,140

UNITED STATES PATENT OFFICE 2,279,140

ELECTRICAL TIRE PRESSURE GAUGE AND INDICATOR

Leo J. Kellen, Ashton, Iowa

Application July 11, 1940, Serial No. 344,980

2 Claims. (Cl. 177—351)

The invention relates to a combined fluid pressure gauge and indicator and more especially to an electrical tire pressure gauge and indicator.

The primary object of the invention is the provision of a device of this character, wherein the instrument board within a motor vehicle presents in full view of an operator thereof, a pressure indicator so that the said operator of such vehicle will at all times have complete knowledge of the exact pressure condition of each pneumatic tire upon the vehicle, including the extra or spare tire, and will warn or indicate when the pressure becomes dangerously low or dangerously high within the tires.

Another object of the invention is the provision of a device of this character wherein accuracy in the working thereof is assured at all speeds of travel of the motor vehicle and in the installation of such device there is not required any radical changes in the standard construction of the motor vehicle.

A further object of the invention is the provision of a device of this character wherein the working assembly is simple, assuring continued service and accuracy for determining the variable pressure conditions within the respective tires of a motor vehicle, being automatic in the operation and requires little or no attention when installed.

A still further object of the invention is the provision of a device of this character which is extremely simple in its construction, thoroughly reliable and efficient in the operation, enables the inflation of the tires of the motor vehicle to the required pressure without the necessity of the use of a separate hand applied gauge or those installed with air pumps which are a part of filling station equipment, and inexpensive to manufacture and install.

With these and other objects in view, the invention consists in the features of construction, combination and arrangement of parts as will be hereinafter more fully described, illustrated in the accompanying drawings which disclose the preferred embodiment of the invention, and pointed out in the claims hereunto appended.

In the accompanying drawings:

Figure 1 is an elevation of an instrument board indicator unit forming a part of the structure constructed in accordance with the invention.

Figure 2 is an enlarged detailed sectional view through one of the instruments of the instrument board unit of the invention.

Figure 3 is a vertical transverse sectional view through a vehicle wheel showing the wheel unit of the invention applied.

Figure 4 is an enlarged fragmentary vertical transverse sectional view through the pressure gauge portion of the wheel unit.

Figure 5 is a sectional view taken on the line 5—5 of Figure 4, looking in the direction of the arrows.

Figure 6 is a fragmentary vertical longitudinal sectional view through a self-adjusting brush employed in the wheel unit.

Figure 7 is a diagrammatic plan view of the electric circuit arrangement of the device constituting the invention.

Similar reference characters indicate corresponding parts throughout the several views in the drawings.

Referring to the drawings in detail A designates generally a portion of a motor vehicle wheel, there being involved as usual one of such wheels fore and aft at each side of a motor vehicle (not shown), and each wheel is provided with a pneumatic tire 10 while under present day equipment of the motor vehicle, a spare or extra tire 11 is carried by such vehicle in any desirable manner. Associated with the motor vehicle, its wheels A and tires 10 and 11 respectively, is the pressure gauge and indicator device including a wheel unit B and instrument board unit C, respectively, constituting the present invention as will be hereinafter fully described.

Each wheel A conforms to present day construction whereby the rim section 12 is separably fastened to the hub section 13, the latter having a brake drum 14. The hub section 13 with the drum 14 rotates upon an axle 15 as usual, and within this drum 14 concentric to the hub proper of said section 13 is an annular contact ring 16, being fixed thereto in any desirable manner and insulated therefrom at 17.

The rim section 12 has fitting with the tire 10 or 11, each including an inner tube 18, for inflation and deflation in the customary manner. Each rim section 12 carries a casing or boxing 19 provided with a coupling stud 20 at its base 21 for fastening to the said rim section 12. This base 21 is fitted with a fluid pressure actuated flexible diaphragm 22 which with the base 21 creates within the casing or boxing 19, a fluid pressure chamber 23 for receiving fluid pressure through a passage 24 leading through the stud 20 and said base 21 for action upon the diaphragm 22. A nipple 25 is threaded in this passage 24 and to which is connected a supply tube 26 communicating with the inner tube 18 of the tire 10 or 11 for the flow of fluid under pressure from the latter to the chamber 23 to actuate the diaphragm 22 for a purpose presently described.

This diaphragm 22 carries a grounded contact 27, the grounding being had through the motor vehicle body and chassis as is common with electrical equipment of such vehicle.

The casing or boxing 19 is fitted with a fixed contact 28 having the lead wire connection 29 with the contact ring 16. Within the casing or boxing 19 is a leaf spring contact 30 engageable with the contact 28. This contact 30 is projected from and fixed at 31 to an adjustable calibrator member support 32 which is fixed to and insulated at 33 on the casing or boxing. The calibrator member 34 on the support 32 carries a resistance or heating coil 35 which has electric connection with the spring contact 30 through the member 34. The member 34 is urged against an adjustable calibrator screw 37 accessible outside of the casing or boxing 19 for manual adjustment. The screw 37 is insulated at 38 from the member 34. The member 34 has a bi-metal contact 39 insulated from the said member 34 and engageable with the ground contact 27, said contact 39 being affected by the coil 35 for varying contact activity of said contact 39 with the contact 27 in conformity with high or low pressure tire demands.

The drum 14 cover plate 40 which is stationary about the wheel axle has fitted thereto a brush barrel 41 containing a self-adjustable carbon brush 42 for contact with the rim 16, the brush being urged against the latter by a spring 43 with the barrel 41 which spring is in electrical connection with an electrical lead wire 44. The barrel 41 is adjustable at 45 for variable positive contact of the brush 42 with the contact ring 16.

The instrument board unit C involves a plurality of indicator instruments for fluid pressure indications, one for each tire pressure reading, and includes a casing or boxing 46 provided with a transparent front 47 for visibility of a movable indicator hand or point 48 and a fluid pressure scale or graduated marking 49 upon a dial 50, the scale or marking being traversed by the said hand or pointer 48 for pressure reading purposes.

The hand or pointer 48 is pivoted at 51 within the casing or boxing 46 and has linkage connections 52 with a bi-metal thermo flexed arm 53 fixed at 54 to a swingable calibrator gear segment 55 which through a cog 56 meshing therewith is susceptible of adjustment manually without the casing or boxing 46 at its back, so that the bi-metal arm 53 can be regulated for a change of working condition of the same as may come about through the use of high or low pressure pneumatic tires.

The linkage connections 52 includes a presser horn 57 being insulated at 58 from a contact point 59 and coacting with adjustable V-shaped spring contacts 61 and 62, respectively, spaced from each other and at opposite sides of the contact point 59.

The contacts 61 and 62 are arranged in electrical connection with an electric storage battery circuit through wiring 63. The contact 59 when engaged with contact 61 closes the said circuit and in this position the movement of the hand or pointer 48 with relation to the scale or markings 49 is indicative of a high pressure reading thereon. The contact 59 when engaging the contact 62 closes the circuit through wiring 63 and in this position the movement of the hand or pointer 48 with relation to the scale or markings 49 is indicative of a low pressure reading thereon.

The closing of the circuit by the said contact 59 automatically illuminates a warning light signal 64 which is included in the said circuit so that an operator of the motor vehicle will have cognizance of high or low pressure conditions of the tires on the said vehicle. About the bi-metal arm 53 is a resistance or heating coil 65 which through electrical connections 66 and 67, respectively, is arranged within the circuit D, the wiring connection 29 being joined with the connection 67 for arranging the wheel unit B of the device within the said circuit D, and the ground connections for these units D and C, respectively, in this circuit are established by the body and chassis constructions of the motor vehicle.

Acting as a pivoting base for the indicator arm 48 is a leaf spring 68 which by the adjustment of a segmental gear 69 with which meshes a hand cog 70 accessible from without the casing or boxing 46 at its back, can be regulated for increasing or decreasing the tensioning action of the arm 53.

The spring 68 tensions the bi-metal arm 53 for varying its spring activity. The contact point 59 normally moves with the bi-metal arm 53 and horn 57 toward the contact 62 and during this movement, the hand or pointer 48 traverses the scale or markings 50 in a direction for indicating low pressure reading. On reverse movement of the contact point 59 which is brought about through the flexing of the bi-metal arm 53 resultant from the heating of the latter by the heating coil 65, such movement causes the hand or pointer to traverse the scale or markings 50 in a direction for indicating high pressure reading thereof.

Arranged within the unit C is a night lamp 71 its circuit 72 being controlled by a hand switch 73 included therein. This lamp 71 when lighted illuminates the instruments within the said instrument board unit for easy reading of the dials of the grouped instruments. The circuit D is provided with a hand switch 74 so that it can be actuated by hand for the opening and closing of this circuit at will.

Each instrument of the unit C carries indicia as at 75 for identifying a particular tire so that the pressure condition thereof can be ascertained, that is to say, "r. f.," which is indicative of right front tire; "l. f.," which is indicative of left front tire; "r. r." which is indicative of right rear tire; "l. r." which is indicative of left rear tire; and "spare," which is indicative of the spare or extra tire.

From the foregoing it will be apparent that an operator of the motor vehicle having the device installed therein can at a glance determine with accuracy the pressure reading of air within each and all of the tires with which the motor vehicle is equipped, and particularly with regard to dangerously low or dangerously high pressure conditions of such tires.

It is believed that from the foregoing, the construction and manner of operation of the device will be clearly understood without the requiring of a more extended explanation and therefore the latter has been omitted. It is of course understood that changes, variations, and modifications may be made in the device, that is in the structure set-up thereof as fall properly within the scope of the appended claims without departing from the spirit of the invention or sacrificing any of its advantages.

What is claimed is:

1. In a pressure controlled transmitter, a mounting, a diaphragm carried by said mounting and responsive to a variable pressure source, a contact of an electric circuit secured to and movable with said diaphragm, a spring influenced member movably secured to and insulated from said mounting and opposing the diaphragm, means for electrically connecting said member in the electric circuit, a bi-metal contact carried by said member and coactive with the first named contact for controlling said circuit, an electric heating means for said bi-metal contact and electrically connected to said member, and an adjusting means for the member to vary the position of the bi-metal contact with respect to the first named contact.

2. In a pressure controlled transmitter, a mounting, a diaphragm carried by the mounting and responsive to a variable pressure source, a contact of an electric circuit carried by the diaphragm, a member hinged on and insulated from the mounting and arranged in opposed relation to the diaphragm, tension means acting on said member to urge the latter away from the diaphragm, means electrically connecting said member to the electric circuit, a bi-metal contact carried by said member and coactive with the first named contact in controlling the electric circuit, an electric heating element for said bi-metal contact and electrically connected to said member, and a set screw carried by said mounting and engaging the member to vary the bi-metal contact with respect to said first named contact.

LEO J. KELLEN.